United States Patent
Hasegawa et al.

(10) Patent No.: US 7,168,756 B2
(45) Date of Patent: Jan. 30, 2007

(54) VEHICLE FRONT PILLAR CONSTRUCTION

(75) Inventors: Yoshiharu Hasegawa, Wako (JP); Kazumi Kodama, Wako (JP); Kosaku Tomozawa, Wako (JP); Shuhei Hamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/298,228

(22) Filed: Dec. 9, 2005

(65) Prior Publication Data

US 2006/0138807 A1 Jun. 29, 2006

(30) Foreign Application Priority Data

Dec. 27, 2004 (JP) .............................. 2004-375276
Dec. 27, 2004 (JP) .............................. 2004-375492

(51) Int. Cl.
*B62D 25/00* (2006.01)

(52) U.S. Cl. .................. 296/203.03; 296/205

(58) Field of Classification Search ........... 296/193.02, 296/205, 187.1, 203.03, 203.01
See application file for complete search history.

(56) References Cited

U.S. PATENT DOCUMENTS 5,941,597 A * 8/1999 Horiuchi et al. ....... 296/203.01
6,394,536 B2 * 5/2002 Takahara ............... 296/187.05

FOREIGN PATENT DOCUMENTS

JP          2002-2533       1/2002

* cited by examiner

*Primary Examiner*—Joseph D. Pape
(74) *Attorney, Agent, or Firm*—Rankin, Hill, Porter & Clark LLP

(57) ABSTRACT

A vehicle front pillar construction has a hollow member formed integrally to have a closed cross section, having a front supporting a windshield and a pair of sides whose width direction coincides with a direction which follows the line of sight of a driver, a door seal mounted on the side of the hollow member which is situated spaced away from the front and an outer member mounted on the front of the hollow member in such a manner as to cover the hollow member from the door seal to the windshield.

11 Claims, 7 Drawing Sheets

VEHICLE FRONT PILLAR CONSTRUCTION

The present invention claims foreign priority to Japanese patent applications No. P.2004-375276 and P.2004-375492, both of which were filed on Dec. 27, 2004, the contents of which are incorporated herein by references.

BACKGROUND OF THE INVENTION

1. Field of the Invention

The present invention relates to a vehicle front pillar construction.

2. Description of the Background Art

As a vehicle front pillar, there is known a front pillar 100 as shown in FIG. 7 in which an outer panel 102 and an inner panel 103 are joined together at flange portions 104, 105 formed along both edges thereof with a stiffener 101 held therebetween to thereby form a closed cross section. In this front pillar 100, the volume of the closed cross section is secured by a balance between a maximum width dimension C and a maximum depth dimension D so as to satisfy the body rigidity and collision performance thereof. In the case of the this front pillar 100, a windshield 110 is supported by the flanges 104, which are one of the flanges, a gap between the windshield 110 and the outer panel 102 is closed by a garnish 111, a door seal 112 is provided on the flanges 105, which are the other of the flanges, so that a seal is produced between a door sash 113 and the front pillar 100 by the door seal 112 so provided, and an interior material 114 is mounted further inside than the front pillar 100 so as to cover the inner panel 103.

In addition, there exists another front pillar construction (refer, for example, to Japanese Patent Unexamined Publication No. JP-A-2002-2533) in which a hollow member with a closed cross section is integrally molded by a hydroforming process in order to realize an increase in body rigidity and an outer panel is mounted on an outside of the hollow member so molded so as to form a front pillar. In this front pillar, a flange portion is provided at one end of the outer panel in such a manner as to project further outwards than the hollow member so as to support a windshield by the flange portion so provided.

In the case of the related-art front pillar construction shown in FIG. 7, while a range of blind spot is produced from an end portion of the interior material 114 to an end portion of the door sash 113, since the maximum width dimension C of the closed cross section that is formed by the outer panel 102 and the inner panel 103 and the flange portion 104 is provided which supports the windshield 110, a width dimension of the interior material 114 becomes extremely large, and as a result, the range of blind spot is increased.

In addition, also in the case of the front pillar disclosed in the JP-A-2002-2533 which includes the hollow member and the outer panel, since the flange portion projecting further outwards than the hollow member is provided at the end of the outer panel so that the windshield is mounted thereon, a range of blind spot is also increased.

SUMMARY OF THE INVENTION

To cope with this, the invention was made to provide a front pillar construction which can narrow the range of blind spot while satisfying the body rigidity and collision performance of a font pillar to be constructed.

With a view to solving the problem, according to a first aspect of the invention, there is provided a vehicle front pillar construction comprising:

a hollow member (for example, a hollow member 10, 210 in an embodiment which will be described later on) formed integrally to have a closed cross section, comprising:

a front (for example, a front 11, 211 in the embodiments which will be described later on) supporting a windshield (for example, a windshield 6, 206 in the embodiment which will be described later on) and a pair of sides (for example, sides 12, 13, 212, 213 in the embodiments which will be described later on) whose width direction coincides with a direction which follows the line of sight of a driver;

a door seal (for example, a door seal 30, 230 in the embodiments which will be described later on) mounted on the side (for example, the side 13, 213 in the embodiments which will be described later on) of the hollow member which is situated spaced away from the front; and an outer member (for example, an outer panel 20, 220, a garnish 40, 240 in the embodiments which will be described later on) mounted on the front of the hollow member in such a manner as to cover the hollow member from the door seal to the windshield.

By adopting the above configuration, a horizontal width dimension of the front pillar can be narrowed while satisfying the body rigidity and the collision performance.

According to a second aspect of the present invention, as set forth in the first aspect of the present invention, it is preferable that the outer member comprises an outer panel (for example, the outer panel 20, 220 in the embodiments which will be described later on) supported at a corner portion (for example, a corner portion 14, 214 in the embodiments which will be described later on) which is defined between the front and the side on which the door seal is mounted of the hollow member.

By adopting the above configuration, the positioning and joining of the outer panel to the hollow member can be facilitated.

According to a third aspect of the present invention, as set forth in the second aspect of the present invention, it is preferable that the outer member comprises a garnish (for example, the garnish 40, 240 in the embodiment which will be described later on) mounted between the outer panel and the windshield.

By adopting the above configuration, a gap between the outer panel and the windshield can be closed, thereby facilitating the installation.

According to a fourth aspect of the present invention, as set forth in the first aspect of the present invention, it is preferable that the hollow member made to have the closed cross section by disposing a pair of plate materials (for example, plate materials 210A, 210B in the embodiment which will be described later on) in such a manner as to oppositely face each other and superposing flange portions (for example, flange portions 215, 216 in the embodiment which will be described later on), which are provided at both end portions of the respective plate materials, on each other to join the flange portions so superposed.

According to a fifth aspect of the present invention, as set forth in the first aspect of the present invention, it is preferable that the hollow member is set such that a depth dimension which follows the line of sight of the driver is larger than a horizontal width dimension thereof.

According to the first aspect of the invention, since the horizontal width dimension can be narrowed while satisfying the body rigidity and the collision performance, the range of blind spot by the front pillar can be narrowed to thereby improve the field of vision.

According to the second aspect of the invention, the positioning and joining of the outer panel to the hollow member can be facilitated.

According to the third aspect of the invention, the gap between the outer panel and the windshield can be closed, thereby facilitating the installation.

DETAILED DESCRIPTION OF THE PREFERRED EMBODIMENTS

A first embodiment of a front pillar construction according to the invention will be described below with reference to FIGS. 1 to 4.

Figure 1:
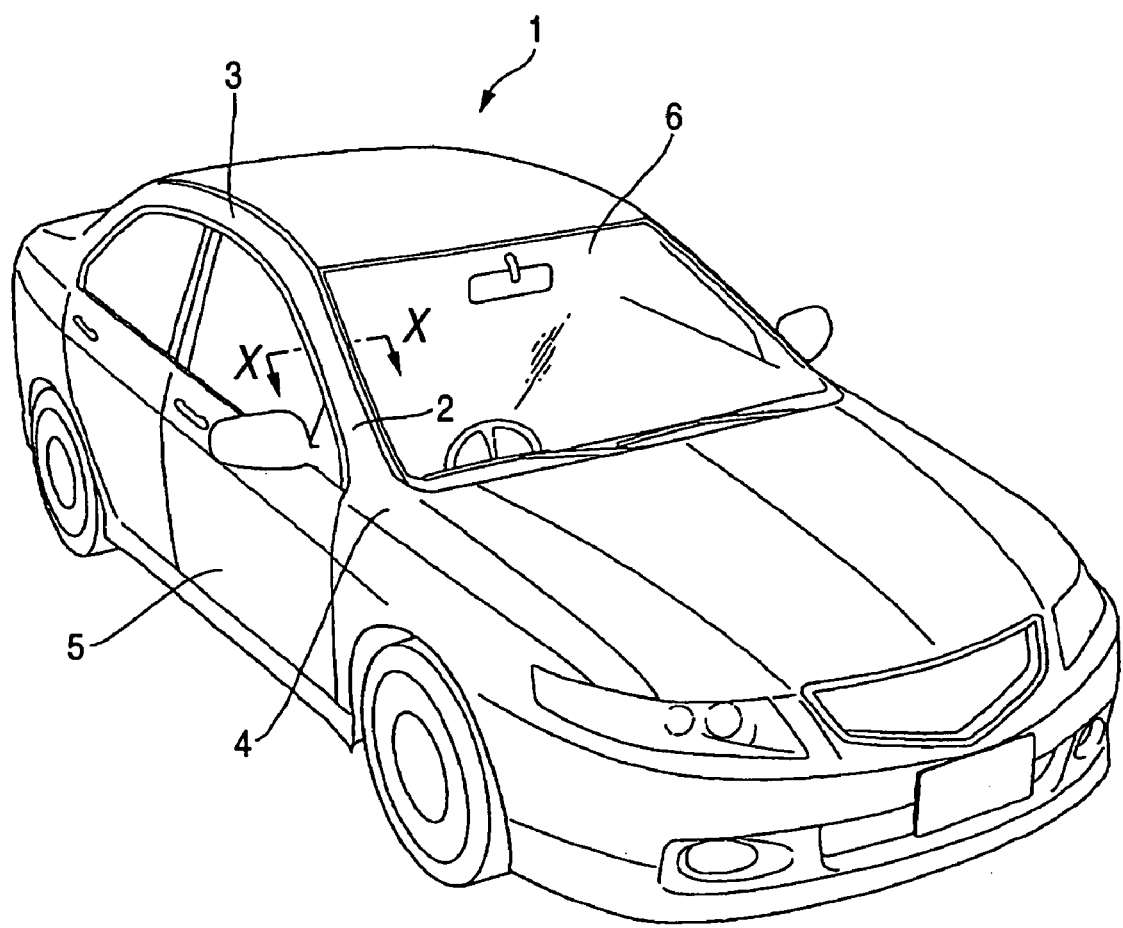
FIG. 1 is a perspective view of a vehicle including a front pillar construction according to the invention.

As shown in FIG. 1, a front pillar 2 of a vehicle 1 constitutes a portion where a roof side portion 3 is connected to a front body side portion 4, forms part of an opening in which a front door 5 is installed and supports an end portion of a windshield at the front of the vehicle (hereinafter, simply referred to as the windshield) 6.

Figure 2:
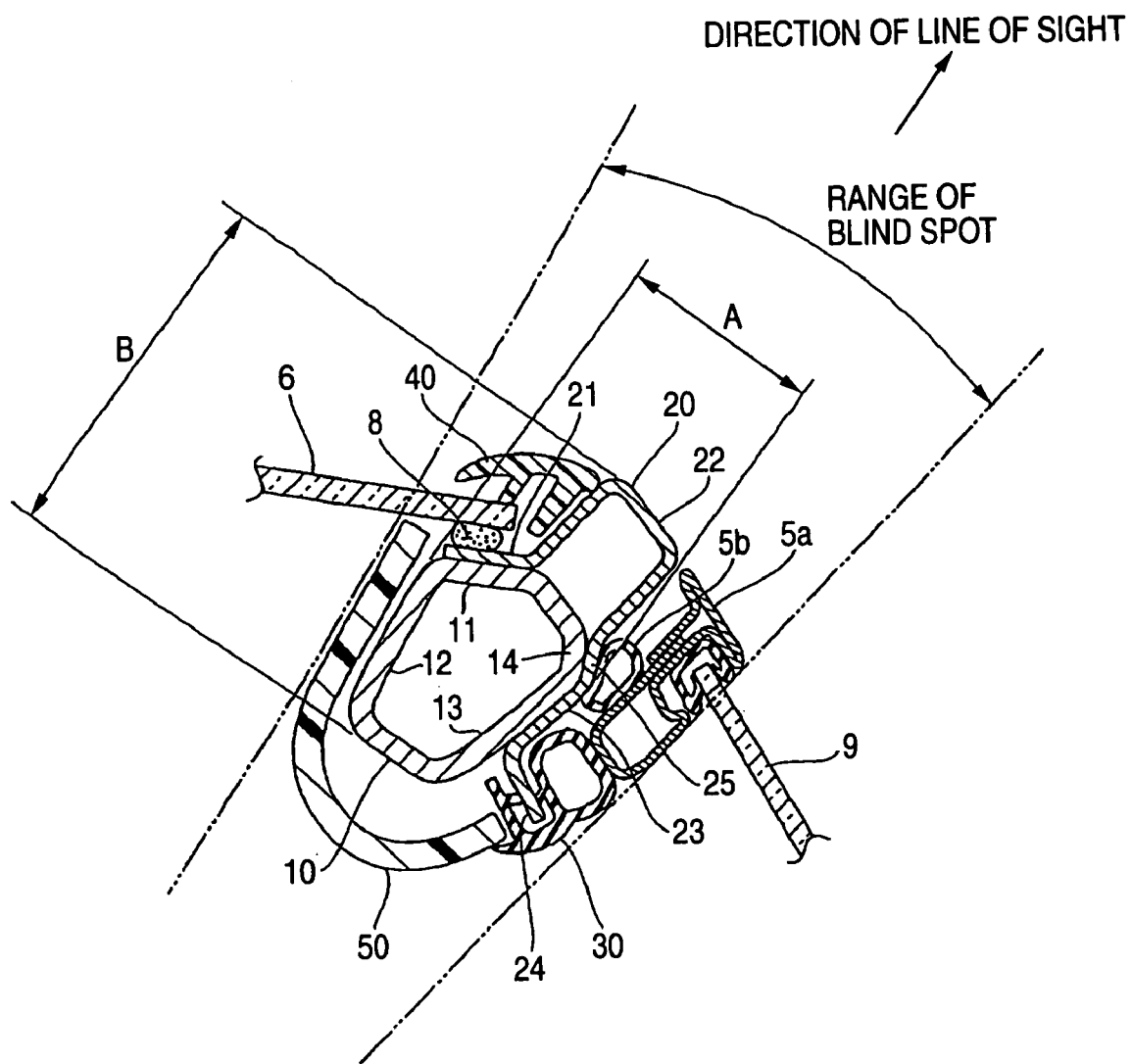
FIG. 2 is a sectional view taken along the line X—X in FIG. 1 according to a first embodiment of the present invention.

As shown in a cross sectional view in FIG. 2, the front pillar 2 includes a hollow member 10 made by joining together a pair of metallic plate materials, a metallic outer panel 20 mounted on an outside of the hollow member 10, a door seal 30, a garnish 40 and an interior panel 50 mounted on an inside of the hollow member 10. Note that the outer panel 20 is formed integrally in such a manner as to extend from the roof side portion 3 to the front body side portion 4.

A hollow member 10 is such as to be integrally molded into a pipe shape having a polygonal closed cross section by a hydroforming process in order to secure the body rigidity and the collision performance and includes at least a front 11 which supports the windshield 6 and a pair of sides 12, 13 whose width direction coincides with a direction which follows the line of sight of a driver (a direction of line of sight in FIG. 2). This hollow member is set such that a depth dimension which follows the line of sight of the driver is larger than a horizontal width dimension.

Figure 3:
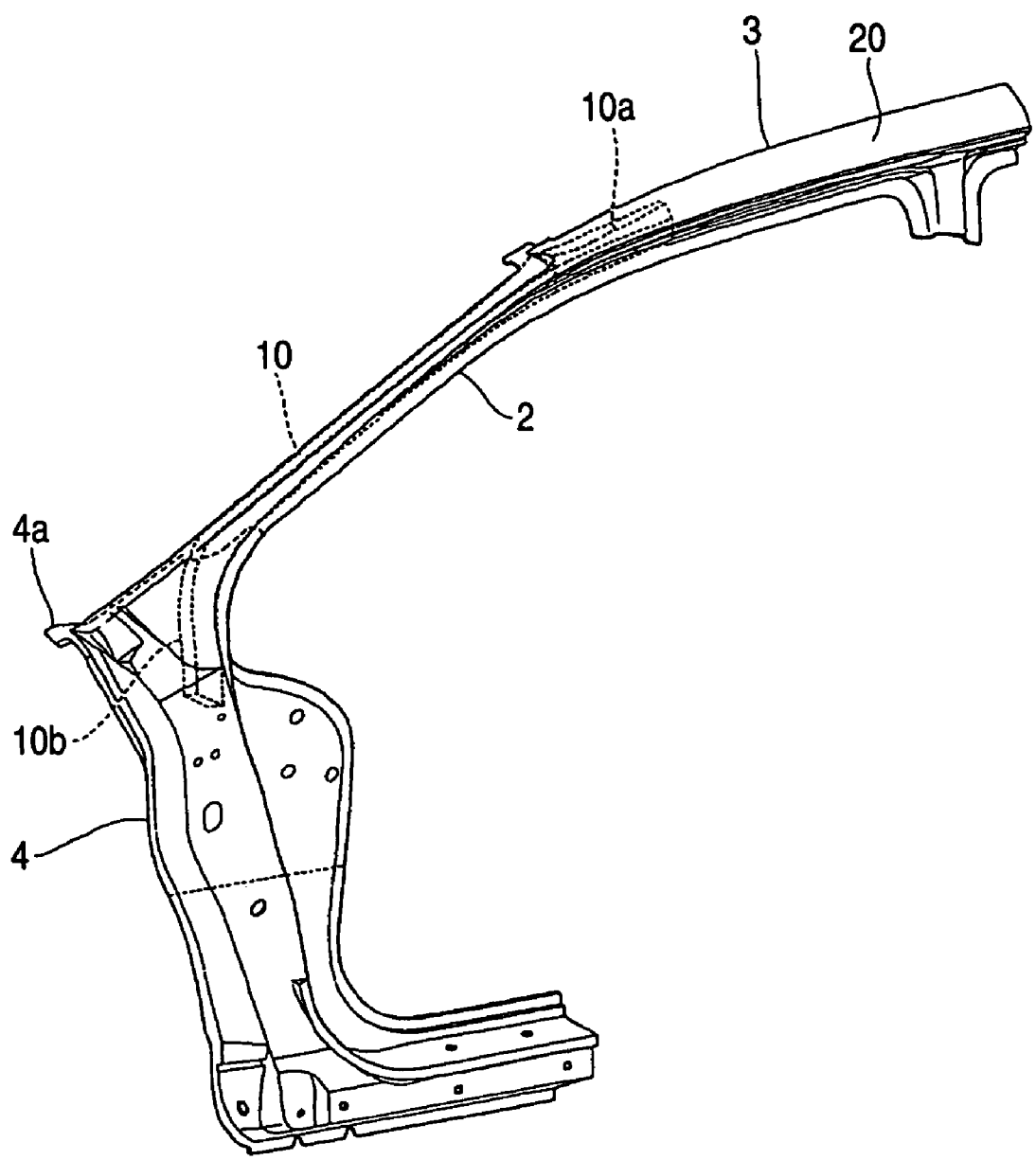
FIG. 3 is a perspective view of a front pillar as viewed from the outside of a vehicle.
Figure 4:
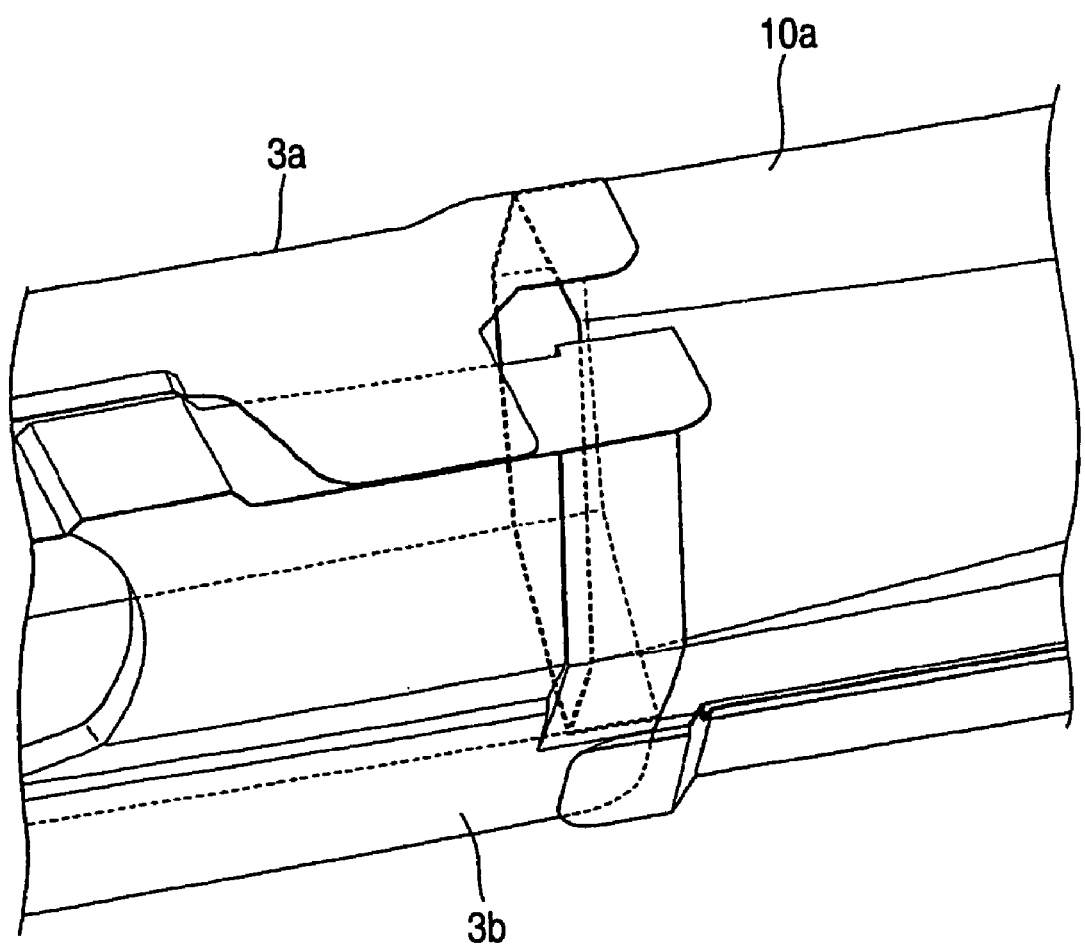
FIG. 4 is a diagram showing a connecting portion between the front pillar and a roof side portion as viewed from the inside of the vehicle.

As shown in FIGS. 3 and 4, a longitudinal end portion 10a of the hollow member 10 is disposed inside end portions of a roof side outer 3a and a roof side inner 3b which are provided inside an outer panel 20 at a roof side portion 3 and is joined to the roof side outer 3a and the roof side inner 3b by virtue of metal inert gas welding (MIG welding).

Figure 5:
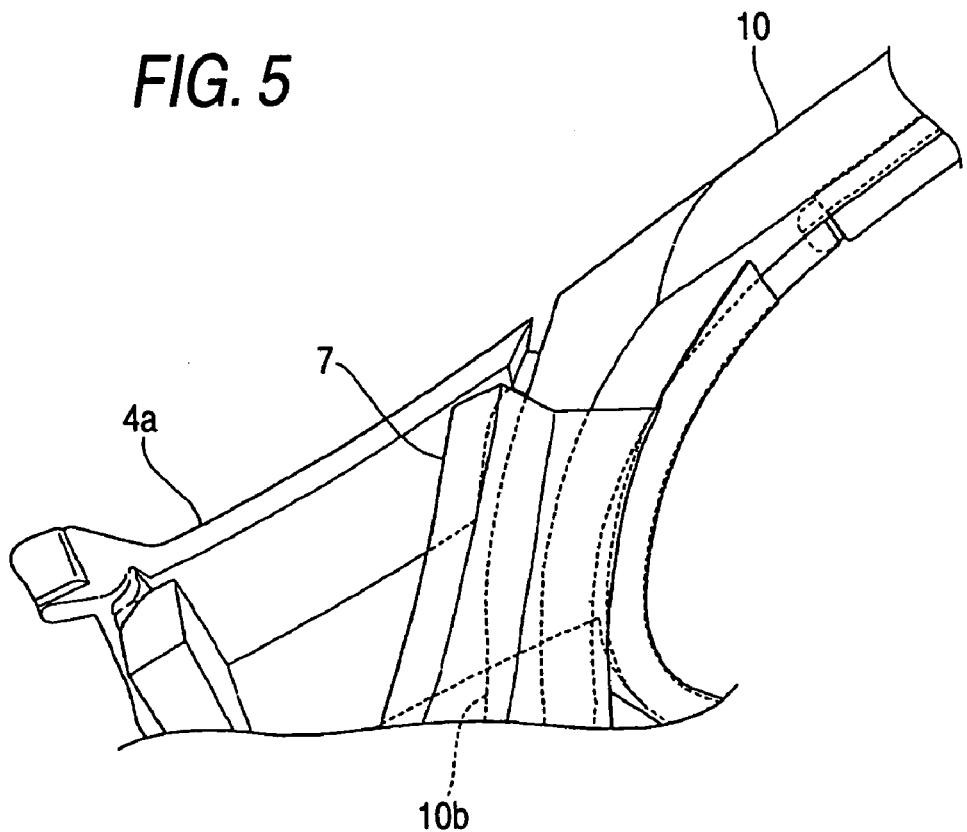
FIG. 5 is a diagram showing the connecting portion between the front pillar and the roof side portion as viewed from the outside of the vehicle through an outer panel.

In addition, as shown in FIGS. 3 and 5, the other longitudinal end portion 10b of the hollow member 10 is disposed between the outer panel 20 and a front body side inner 4a at a front body side portion 4 and is metal inert gas welded to the front body side inner 4a, as well as to a stiffener 7 which holds the other end portion 10b in cooperation with the front body side inner 4a therebetween, and the stiffener 7 is welded to the front body side inner 4a.

Note that FIG. 3 is a perspective view of the front pillar 2 as viewed from the outside of the vehicle, FIG. 4 is a diagram showing a connecting portion between the front pillar 2 and the roof side portion 3 as viewed from the inside of the vehicle, and FIG. 5 is a diagram showing a connecting portion between the front pillar 2 and the front body side portion 4 as viewed from the outside of the vehicle through the outer panel 20.

As shown in FIG. 2, formed on the outer panel 20 at the front pillar 2 are a substantially flat first base portion 21 which is brought into surface abutment with the front 11 of the hollow member 10, a projecting portion 22 which projects outwards substantially into a U-shape from the first base portion 21, a second base portion 23 which is brought into surface abutment with the side 13 of the hollow member 10 which is situated spaced away from the front 11, a flange portion 24 which extends outwards from the second base portion 23 substantially at right angles and a stepped portion 25 formed between the projecting portion 22 and the second base portion 23.

The first base portion 21 is welded to the front 11 of the hollow member 10 on one side thereof and the second portion 23 is welded to the side 13 of the hollow member 10 on one side thereof, whereby the outer panel 20 is fixed to the hollow member 10 at the front pillar 2. In addition, the outer panel 20 at the front pillar 2 can easily be positioned relative to the hollow member 10 by bringing the stepped portion 25 into engagement with a corner portion 14 of the hollow member 10 which is adjacent to the side 13 thereof and bringing the second base portion 23 into surface abutment with the side 13 of the hollow member 10.

The door seal 30 is mounted on the flange portion 24 of the outer panel 20. In other words, the door seal 30 is mounted on the side 13 of the hollow member 10 via the flange portion 24 of the outer panel 20. This door seal 30 is brought into close contact with a door sash 5a for seal when a front door 5 is closed. In addition, a seal member 5b mounted on the door sash 5a is brought into close contact with the stepped portion 25 of the outer panel 20 for seal when the front door 5 is closed.

In addition, an end portion of the windshield 6 is attached to the first base portion 21 with an adhesive 8. Namely, the front 11 of the hollow member 10 supports the windshield 6 via the first base portion 21 of the outer panel 20.

Then, the garnish 40 is mounted between the projecting portion 22 of the outer panel 20 and the windshield 6. In this embodiment, the outer panel 20 and the garnish 40 constitute an outer member which covers the hollow member 10 from the door seal 30 to the windshield 6.

Note that reference numeral 9 in FIG. 2 denotes a window glass in a front side window of the front door 5.

In this front pillar 2, since the first base portion 21 of the outer panel 20 is joined to the front 11 of the hollow member 10 and the front 11 supports the windshield 6 via the first base member 21, there is eliminated a case where a windshield mounting flange portion projects from a hollow member 10 as found in the related art examples. In addition, a required cross sectional area to satisfy the rigidity and collision performance of the front pillar 2 is secured by maintaining a horizontal width dimension A (refer to FIG. 2) of the hollow member 10 low and setting a dimension B (refer to FIG. 2) of a portion where the hollow member 10 and the projecting portion 22 of the outer panel 20 are combined together and which extends to follow the direction of line of sight of the driver as predetermined.

Consequently, a range of blind spot by the front pillar 2 can be narrowed while satisfying the body rigidity and collision performance of the front pillar 2.

Next, a second embodiment of the front pillar construction according to the invention will be described below with reference to FIG. 8.

Figure 8:
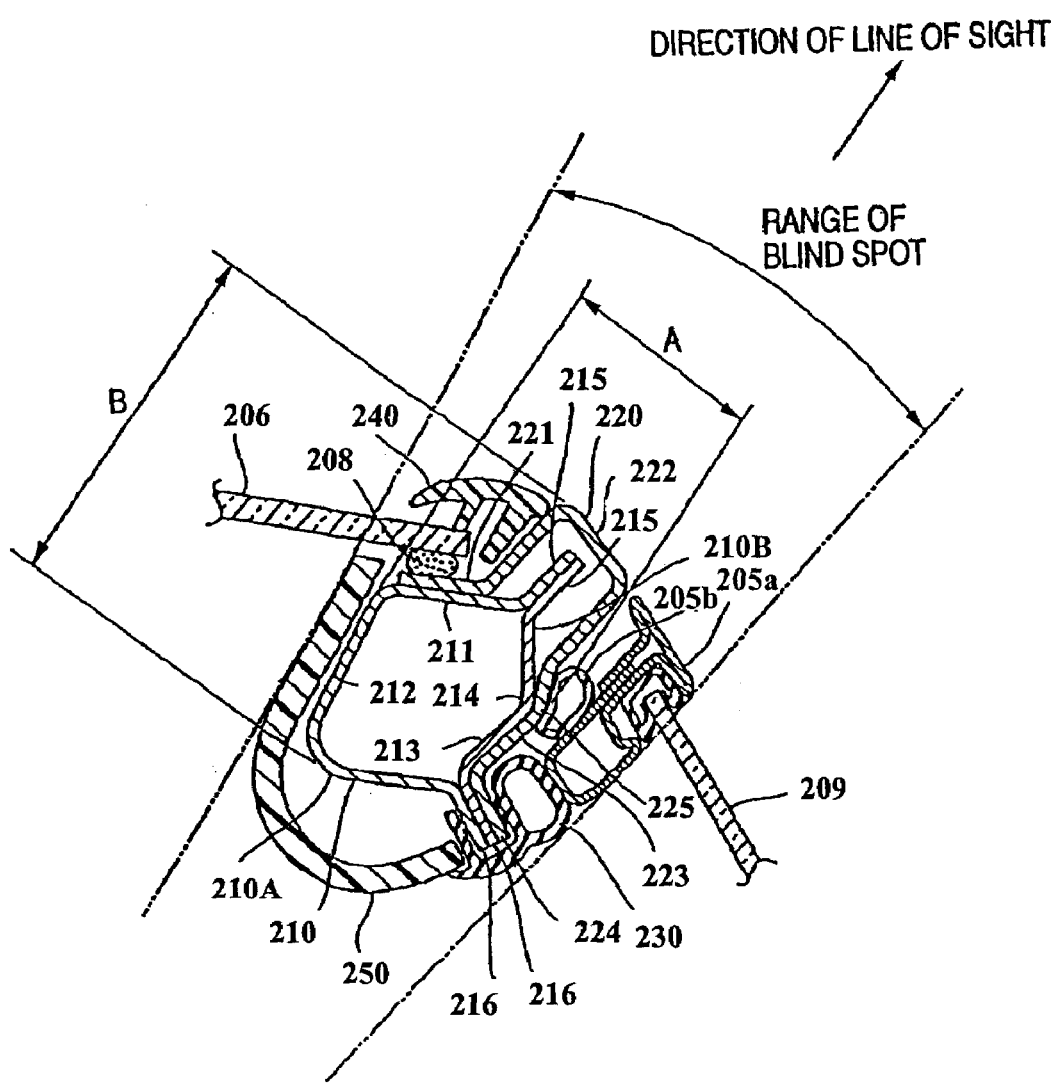
FIG. 8 is a sectional view taken along the line X—X in FIG. 1 according to a second embodiment of the present invention.

As shown in a cross sectional view in FIG. 8, the front pillar 202 includes a hollow member 210 made by joining together a pair of metallic plate materials, a metallic outer panel 220 mounted on an outside of the hollow member 210, a door seal 230, a garnish 240 and an interior panel 250 mounted on an inside of the hollow member 210. Note that the outer panel 220 is formed integrally in such a manner as to extend from the roof side portion 203 to the front body side portion 204.

The hollow member 210 is such as to be made to have a polygonal crossed cross section by disposing the pair of metallic plate materials 210A, 210B in such a manner as to oppositely face each other and superposing flange portions 215, 215 and 216, 216 which are provided along both edge portions of the respective plate materials 210A, 210B on each other so as to weld join the flange portions so superposed to each other and includes at least a front 211 which supports the windshield 206 and a pair of sides 212, 213 whose width direction coincides with a direction (a direction of line of sight in FIG. 8) which follows a direction of line of sight of the driver. Note that in this embodiment, the front 211 and the side 212 are formed on one of the plate materials 210A, whereas the side 213 is formed on the other of the plate materials 210B. A depth dimension of a cavity portion of the hollow member 210 which is directed in the direction which follows the line of sight of the driver (hereinafter, referred to as a direction of line of sight) is set larger than a horizontal width dimension thereof.

Then, the flange portions 215, which are one of the flange portions, are disposed between the two sides 212, 213 and are provided continuously to an end portion of the front 211, whereby distal ends of the flange portions 215 are made to extend outwards of the vehicle along the direction of line of sight. In addition, the other flange portions 216 are provided continuously to an end portion of the side 213 which is situated spaced away from the front 211, and distal ends of the flange portions 216 are bent outwards substantially at right angles from the side 213.

As shown in FIG. 8, formed on the outer panel 220 at the front pillar 202 are a substantially flat first base portion 221 which is brought into surface abutment with the front 211 of the hollow member 210, a projecting portion 222 which projects outwards substantially into a U-shape from the first base portion 221, a second base portion 223 which is brought into surface abutment with the side 213 of the hollow member 210 which is situated spaced away from the front 211, a flange portion 224 which extends outwards from the second base portion 223 substantially at right angles and a stepped portion 225 formed between the projecting portion 222 and the second base portion 223.

The first base portion 221 is welded to the front 211 of the hollow member 210 on one side thereof and the second portion 223 is welded to the side 213 of the hollow member 210 on one side thereof, whereby the outer panel 220 is fixed to the hollow member 210 at the front pillar 202. In addition, in the outer panel 220 at the front pillar 202, the flange portion 224 is superposed on the flange portions 216 of the hollow member 210 by bringing the stepped portion 225 into engagement with a corner portion 214 of the hollow member 210 which is adjacent to the side 213 thereof and bringing the second base portion 223 into surface abutment with the side 213 of the hollow member 210.

The door seal 230 is mounted on a portion where the flange portion 224 of the outer panel 220 is superposed on the flange portions 216 of the outer member 210. This door seal 230 is brought into close contact with a door sash 205a for seal when a front door 205 is closed. In addition, a seal member 205b mounted on the door sash 205a is brought into close contact with the stepped portion 225 of the outer panel 220 for seal when the front door 205 is closed.

In addition, an end portion of the windshield 206 is attached to the first base portion 221 with an adhesive 208. Namely, the front 211 of the hollow member 210 supports the windshield 206 via the first base portion 221 of the outer panel 220.

Then, the garnish 240 is mounted between the projecting portion 222 of the outer panel 220 and the windshield 206. In this embodiment, the outer panel 220 and the garnish 240 constitute an outer member which covers the hollow member 210 from the door seal 230 to the windshield 206.

Note that reference numeral 209 in FIG. 8 denotes a window glass in a front side window of the front door 205.

In this front pillar 202, since the first base portion 221 of the outer panel 220 is joined to the front 211 of the hollow member 210 and the front 211 supports the windshield 206 via the first base member 221, there is eliminated a case where a windshield mounting flange portion projects from a hollow member 210 as found in the related art examples. Moreover, since the flange portions 215 of the hollow member 210 are disposed between the sides 212, 213, no blind spot is produced singly by the flange portions 215. In addition, a required cross sectional area to satisfy the rigidity and collision performance of the front pillar 202 is secured by maintaining a horizontal width dimension A (refer to FIG. 8) of the hollow member 210 low and setting a dimension B (refer to FIG. 8) of a portion where the hollow member 210 and the projecting portion 222 of the outer panel 220 are combined together and which extends to follow the direction of line of sight of the driver as predetermined.

Consequently, a range of blind spot by the front pillar 202 can be narrowed while satisfying the body rigidity and collision performance of the front pillar 202.

Figure 6:
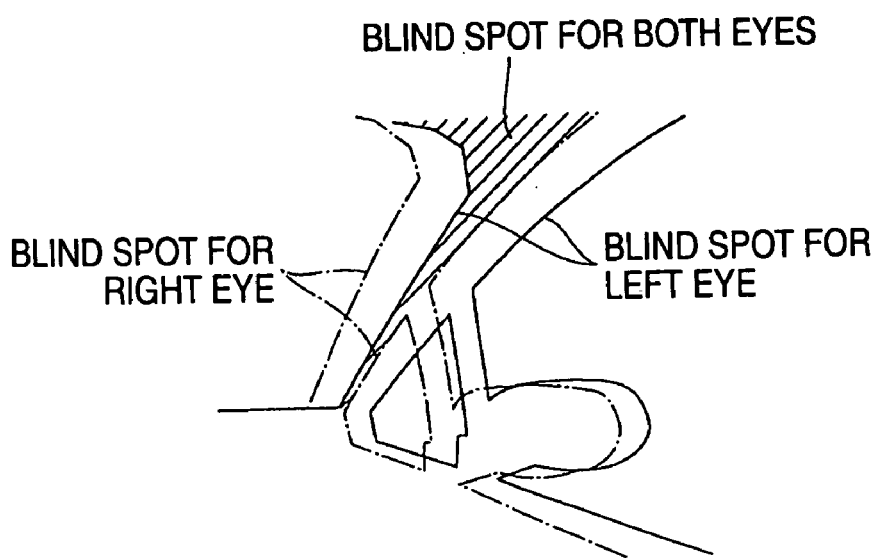
FIG. 6 is a diagram showing a blind spot by the front pillar.
Figure 7:
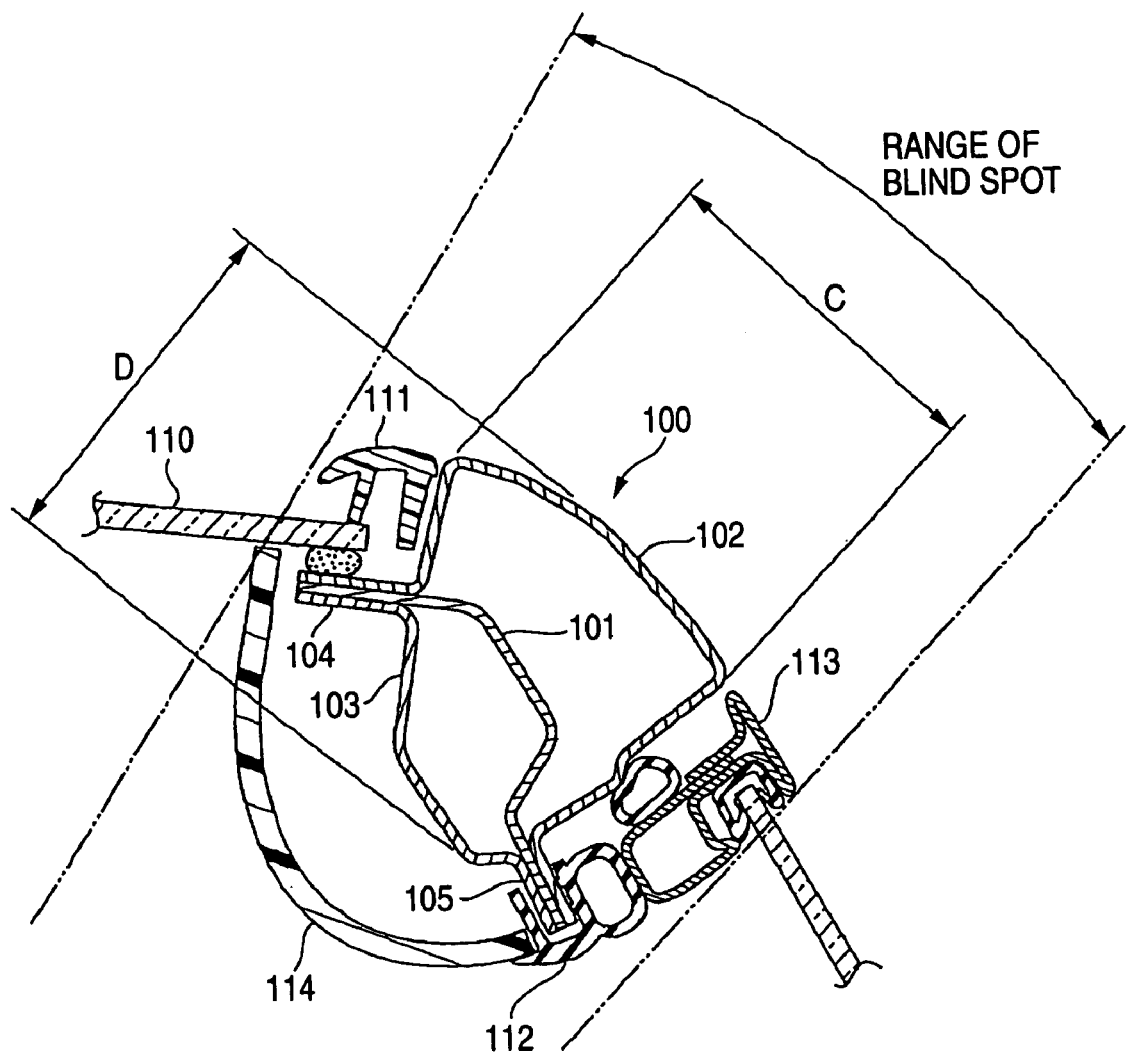
FIG. 7 is a sectional view of a related-art front pillar.

Incidentally, to describe the mechanism of the blind spot by the front pillar 2, 202 by reference to FIG. 6, a portion (a hatched portion in FIG. 6) where a blind spot for the left eye (indicated by solid lines in FIG. 6) and a blind spot for the right eye (indicated by chain lines in FIG. 6) overlap each other constitutes a blind spot where the driver's view by both the left and right eyes is obstructed. Consequently, theoretically, it is possible to set the width dimension of the front pillar 2, 202 such that the blind spot by both the left and right eyes is completely eliminated. On the contrary, however, with the blind spot by the front pillar 2, 202 completely eliminated, the driver feels a sensation of visual disorder and is made difficult to grasp the overall width of the vehicle. Consequently, with a slight blind spot remaining when viewing with both the eyes, there is produced a boundary between a field of vision resulting forward of the vehicle and a field of vision resulting sideways of the vehicle, and this facilitates the control of the vehicle by the driver.

To cope with this, at the front pillar 2, 202, the width dimension A of the hollow member 10, 210 is set such that a minimum blind spot is produced by the front pillar 2, 202 when viewing with both the eyes, whereby since the blind spot by the front pillar 2, 202 exists, the driver does not have to feel the sensation of visual disorder to thereby facilitate the control of the vehicle, whereas since the blind spot is minimum, objects to be viewed become easy to be recognized, thereby improving the fields of vision.

Note that while in this embodiment, the outer panel 20, 220 is made of a metallic molded product, the metallic outer panel 20, 220 may be replaced with a resin garnish.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle front pillar construction comprising:
   a hollow member formed integrally to have a closed cross section, comprising:
      a front surface supporting a windshield, wherein said windshield is fixed to said front surface such that said windshield is disposed relatively forward of said hollow member; and
      first and second side surfaces extending rearwardly from said front surface, said side surfaces of said hollow member being formed so as to be parallel with a line of sight of a driver;
   a door seal, mounted on the first side surface of the hollow member at a location that is spaced relatively rearwardly from the front surface, whereby the door seal and a door sash, which is provided on the first side of the hollow member and adapted to engage the door seal, overlap each other in the line of sight of the driver; and
   an outer member mounted over the front surface and at least one side surface of the hollow member so as to cover the hollow member from the door seal to the windshield.

2. The vehicle front pillar construction as set forth in claim 1, wherein the outer member comprises an outer panel supported at a corner portion defined between the front surface and the first side surface.

3. The vehicle front pillar construction as set forth in claim 2, wherein the outer member comprises a garnish mounted between the outer panel and the windshield.

4. The vehicle front pillar construction as set forth in claim 1, wherein the hollow member comprises first and second plate materials that oppositely face each other to define the closed cross section of the hollow member, each of said plate materials having a first lateral end defining a first flange and a second lateral end defining a second flange, and wherein said first flanges of said first and second plate materials and said second flanges of said first and second plate materials, respectively, are superposed with one another and joined together to define said closed cross section of the hollow member.

5. The vehicle front pillar construction as set forth in claim 1, wherein the hollow member is set such that a depth dimension which follows the line of sight of the driver is larger than a horizontal width dimension thereof.

6. The vehicle front pillar construction as set forth in claim 1, wherein the hollow member front surface is generally parallel to the windshield.

7. The vehicle front pillar construction as set forth in claim 1, wherein a portion of the outer member is disposed between the windshield and the front surface of the hollow member.

8. The vehicle front pillar construction as set forth in claim 2, wherein the hollow member comprises first and second plate materials that oppositely face each other to define the closed cross section of the hollow member, each of said plate materials having a first lateral end defining a first flange and a second lateral end defining a second flange, and wherein said first flanges of said first and second plate materials and said second flanges of said first and second plate materials, respectively, are superposed with one another and joined together to define said closed cross section of the hollow member.

9. The vehicle front pillar construction as set forth in claim 2, wherein the hollow member is set such that a depth dimension which follows the line of sight of the driver is larger than a horizontal width dimension thereof.

10. The vehicle front pillar construction as set forth in claim 2, wherein the hollow member front surface is generally parallel to the windshield.

11. The vehicle front pillar construction as set forth in claim 2, wherein a portion of the outer panel is disposed between the windshield and the front surface of the hollow member.

* * * * *